United States Patent
Chu et al.

(10) Patent No.: US 7,667,417 B2
(45) Date of Patent: *Feb. 23, 2010

(54) APPARATUS AND METHOD COMPENSATING RECURRING FALSE SPEED ERRORS IN DC MOTOR AND DISK DRIVE ADOPTING SAME

(75) Inventors: Sang-hoon Chu, Yongin-si (KR); Kyoung-whan Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 342 days.

This patent is subject to a terminal disclaimer.

(21) Appl. No.: 11/650,419

(22) Filed: Jan. 8, 2007

(65) Prior Publication Data

US 2007/0160352 A1    Jul. 12, 2007

(30) Foreign Application Priority Data

Jan. 10, 2006   (KR) ...................... 10-2006-0002677

(51) Int. Cl.
*H02P 6/00* (2006.01)
(52) U.S. Cl. ........................... 318/400.01; 318/400.34; 388/928.1
(58) Field of Classification Search ............ 318/400.01, 318/400.1, 400.34, 432, 434, 459, 500; 388/928.1; 360/73.01, 73.03
See application file for complete search history.

(56) References Cited

U.S. PATENT DOCUMENTS

| | | | |
|---|---|---|---|
| 4,460,968 A * | 7/1984 | Cavill et al. ................... 358/1.5 |
| 4,980,617 A * | 12/1990 | Tajima et al. .......... 318/400.04 |
| 5,631,999 A | 5/1997 | Dinsmore |
| 6,034,493 A * | 3/2000 | Boyd et al. ............. 318/400.31 |
| 6,078,458 A * | 6/2000 | Fioravanti et al. ......... 360/73.03 |
| 6,972,540 B1 * | 12/2005 | Wang et al. ............. 318/400.34 |
| 7,012,396 B1 * | 3/2006 | Brenden et al. ............. 318/599 |
| 2005/0062448 A1 * | 3/2005 | Oh et al. ..................... 318/268 |

FOREIGN PATENT DOCUMENTS

| | | |
|---|---|---|
| JP | 09-212218 | 8/1997 |
| JP | 10-021571 | 1/1998 |
| KR | 1993-0015283 | 7/1993 |

* cited by examiner

*Primary Examiner*—Rina I Duda
(74) *Attorney, Agent, or Firm*—Volentine & Whitt, PLLC

(57) ABSTRACT

Provided are an apparatus and method of controlling a motor by compensating for recurring false speed errors generated in a direct current (DC) motor. The apparatus includes a learning control unit adapted to calculate recurring false speed errors related to a mechanical tolerance associated with the motor in each one of a plurality of controlling sections associated with a single rotation of the motor, and generate a corresponding reference speed for each controlling section, and a motor control unit adapted to control the rotational speed of the motor in relation to a speed error defined by a difference between the reference speed for each controlling section and an actual measured speed of the motor for each controlling section.

11 Claims, 5 Drawing Sheets

APPARATUS AND METHOD COMPENSATING RECURRING FALSE SPEED ERRORS IN DC MOTOR AND DISK DRIVE ADOPTING SAME

BACKGROUND OF THE INVENTION

1. Field of the Invention

The present invention relates to an apparatus and method for controlling a motor. More particularly, the invention relates to an apparatus and method for compensating false speed errors repeatedly generated by a direct current (DC) motor.

This application claims the benefit of Korean Patent Application No. 10-2006-0002677, filed on Jan. 10, 2006, the subject matter of which is hereby incorporated by reference.

2. Description of the Related Art

Hard disk drives (HDDs) are commonly used within various host devices, such as personal computers (PCs), as data storage devices. In general operation, HDDs allow data to be written to and read from recording medium (e.g., a disk having a surface subject to variation in its magnetic properties) using a magnetic read/write head. Data is stored on conventional disks in terms of bits per inch (BPI)—a recording density defined in relation to the disk's rotational direction, and tracks per inch (TPI)—a recording density defined in relation to the disk's radial direction. Significant research and development efforts are currently being expended to increase data recording density according to both of these definitions. Additionally, commercial demands are increasing for increasingly small HDDs. The increasing miniaturization of HDDs, together with demands for higher data recording densities, require ever finer and more precise mechanisms within HDD structures.

Conventional HDDs typically rotate one or more disks at a constant angular velocity using a brushless direct current (DC) motor. A feedback signal having a defined sampling frequency is commonly used to control the rotational speed of the disk. Thus, increased precision over the rotational speed of the disk may be obtained by increasingly the sampling frequency rate.

In contemporary HDDs, the rotational speed imparted to the disk by the spindle motor is estimated and controlled in relation to a back electromotive force generated by the motor. This approach provides excellent control while reducing production costs because a separate sensor adapted to detect the motor's rotational speed in not required.

Speed estimation for the motor is typically performed by applying a phase-defined signal as a driving circuit of the motor. The phase signal may be readily generated whenever the back electromotive force generated by the motor passes a zero point, thereby changing the phase of a corresponding back electromotive force. Thus, the phase of the back electromagnetic force changes in relation to the number of magnetic poles in the motor during the rotation of the disk. Therefore, if the motor is controlled by being synchronized with such phase changes, the sampling rate should correspond to the maximum number of magnetic poles apparent in the operation of the motor.

However, if the sampling frequency is increased, the resulting changes in the interval of magnetic poles due to the mechanical tolerance of a permanent magnet within the motor will negatively affect the system's performance. This causes false errors when the measured speed is used as a feedback signal to an HDD controller, and thus, resonance may be generated in the spindle motor.

SUMMARY OF THE INVENTION

Embodiments of the invention provide an apparatus and method compensating for recurring false speed errors which are generated due to certain mechanical tolerances within the motor.

In one embodiment, the invention provides a motor control apparatus compensating recurring false speed errors in a direct current (DC) motor, comprising; a learning control unit adapted to calculate recurring false speed errors related to a mechanical tolerance associated with the motor in each one of a plurality of controlling sections associated with a single rotation of the motor, and generate a corresponding reference speed for each controlling section, and a motor control unit adapted to control the rotational speed of the motor in relation to a speed error defined by a difference between the reference speed for each controlling section and an actual measured speed of the motor for each controlling section.

In another embodiment, the invention provides a method adapted to control operation of a motor, the motor having a mechanical tolerance generating recurring false speed errors, the method comprising; determining operation of the motor at a constant speed, controlling the speed of the motor in accordance with a reference speed, calculating recurring false speed errors associated with the mechanical tolerance in each one of a plurality of controlling sections related to one rotation of the motor, correcting the reference speed in each controlling section in relation to the calculated recurring false speed errors.

In another embodiment, the invention provides a disk drive comprising; a disk adapted to store data, a spindle motor having a mechanical tolerance and adapted to rotate the disk at a constant angular velocity, a spindle motor controller adapted to calculate recurring false speed errors associated with eh mechanical tolerance during a plurality of N controlling sections related to a single rotation of the disk while controlling the speed of the spindle motor in relation to an initial reference speed, and further adapted to correct the reference speed for each controlling sections with reference to a false speed error calculated for each controlling section and generate a control input signal based on a difference between the corrected reference speed and the actual measured motor speed in each controlling sections, and a spindle motor driving unit adapted to generate an electric current in accordance with the control input signal to drive the spindle motor.

DESCRIPTION OF EMBODIMENTS

Figure 1:
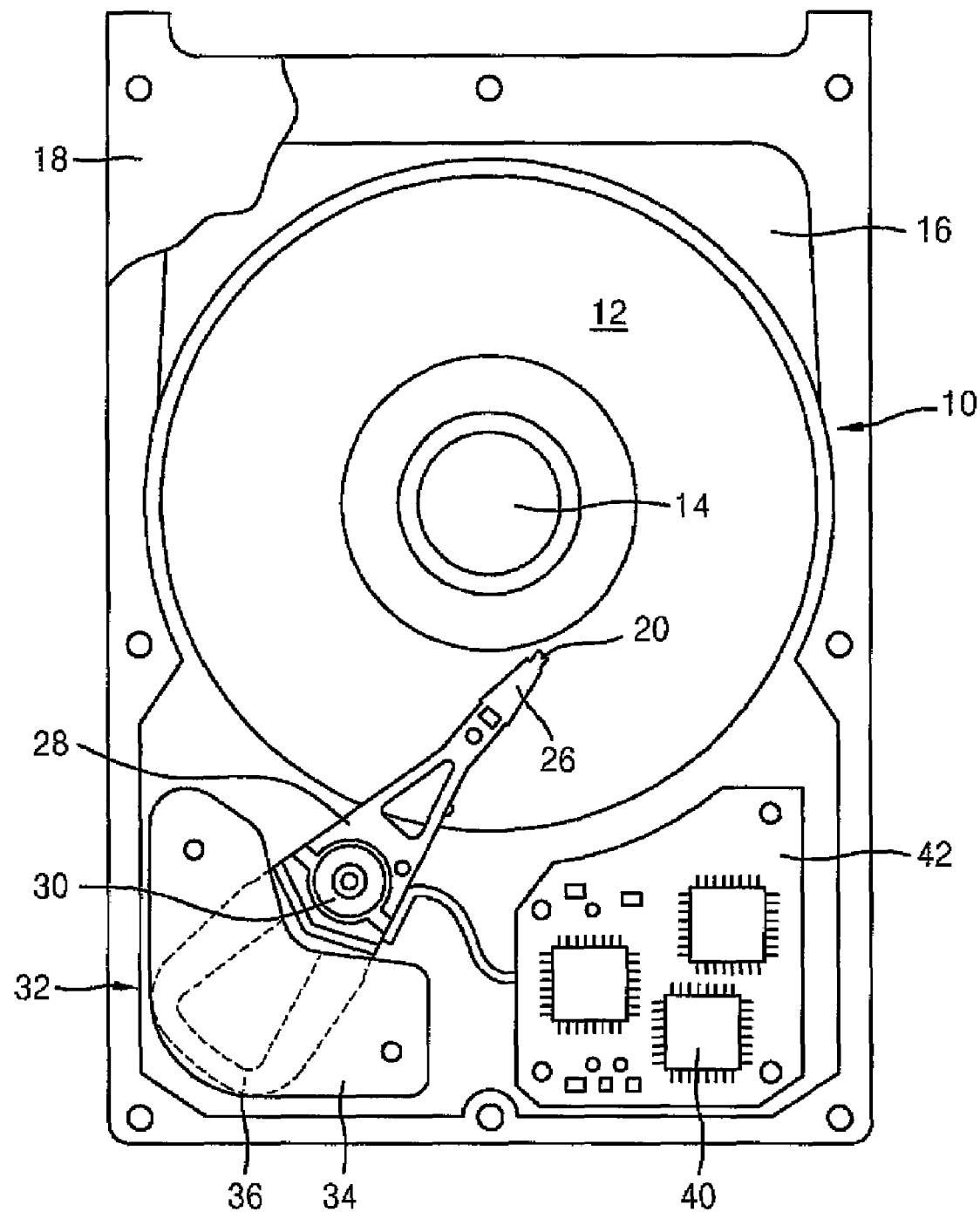
FIG. 1 is a plan view of a disk drive according to an embodiment of the present invention.

FIG. 1 is a block diagram of a hard disk drive (HDD) 10 according to an embodiment of the present invention. HDD 10 may include one or more magnetic disks 12 rotated by a spindle motor 14. (Only a single disk 12 will generally be referenced hereafter, bearing in mind that multiple disk designs, as well as single disk designs are contemplated by the present invention). Spindle motor 14 is installed on a substrate 16. HDD 10 further includes a cover 18 protecting disk 12.

HDD 10 includes a one or more read/write heads 20 floating over disk 12. Each read/write head 20 may includes a write element and/or a read element, either commonly or separately provided. The write element (or write head) is adapted to selectively magnetize disk 12 in order to write data onto disk 12. The read element (or read head) is adapted to sense a magnetic field associated with disk 12 in order to read recorded data. In one embodiment, a read element may take the form of a magneto-resistance element having a resistance that changes linearly with respect to a detected magnetic flux.

Each read/write head 20 may be attached to a flexure arm 26 associated with a head gimbal assembly (HGA). For example, flexure arm 26 may be attached to an actuator arm 28 loaded onto substrate 16 by a bearing assembly 30. A voice coil 32 is coupled to a magnetic assembly 34 in order to supply electric current to a voice coil motor (VCM) 36. When the electric current is supplied to voice coil 32, mechanical torque rotates actuator arm 28, thereby moving read/write head 20 over disk 12.

HDD 10 includes a plurality of integrated circuits (ICs) 40 mounted on a printed circuit board (PCB) 42. ICs 40 and associated components may be connected to voice coil 32, read/write head 20, and spindle motor 14 using electric wires (not shown).

Figure 2:
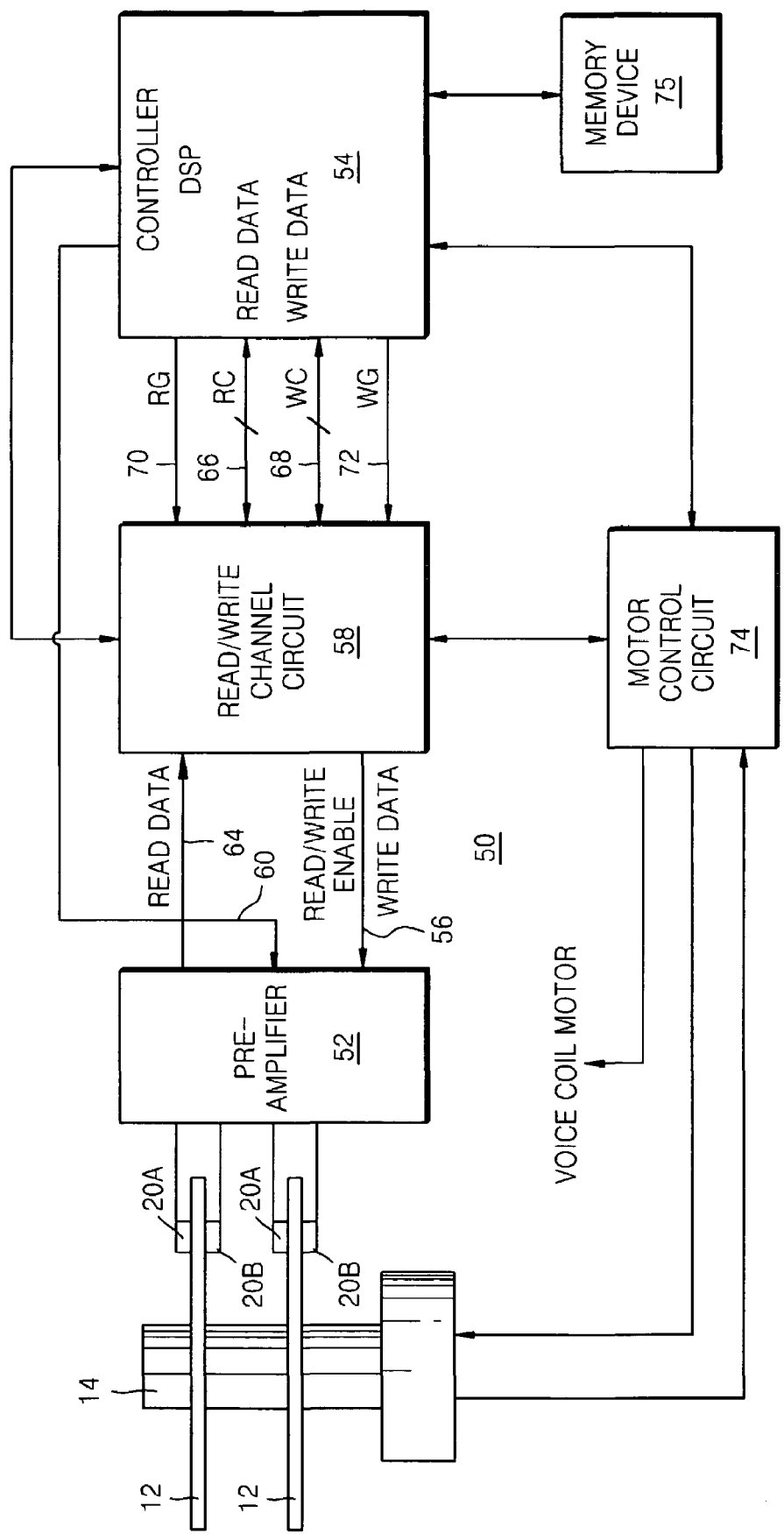
FIG. 2 is a block diagram of an electric circuit in the disk drive, to which an apparatus and method of compensating repeated false speed errors in a direct current (DC) motor is applied, according to an embodiment of the present invention.

FIG. 2 illustrates an electric circuit 50, which in certain embodiments might be implemented by one or more of ICs 40, is adapted to perform read operations in relation to data stored on one or both of disks 12. Electric circuit 50 comprises in the illustrated embodiment a pre-amplifier 52 connected to read/write heads 20. (The illustrated example of FIG. 2 shows two disks 12 and multiple read/write heads 20A/20B). Pre-amplifier 52 is connected to a read data channel 64 communicating a read signal related to data read from disk 12, and a write data channel 56 communicating a write signal related to data to be written to disk 12. The read signal is provided to, and the write signal is provided from a read/write channel circuit 58. Pre-amplifier 52 also receives a read/write enable signal directly from a controller 54. This signal controls read/write operations to disk 12. Controller 54 may be implemented as a conventional digital signal processing circuit adapted to execute controlling software stored in a memory associated therewith (e.g., non-volatile, or ROM, memory 75).

Read/write channel circuit 58 is connected to controller 54 through a plurality of read/write control channels 66, 68, 70 and 72. For example, in the illustrated embodiment, read control channel 70 is enabled when data is to be read from disk 12, and write control channel 72 is enabled when the data is to be written to disk 12. Read/write channel circuit 58 and controller 54 are also connected to a motor control circuit 74 adapted to control VCM 36 and spindle motor 14.

Figure 3:
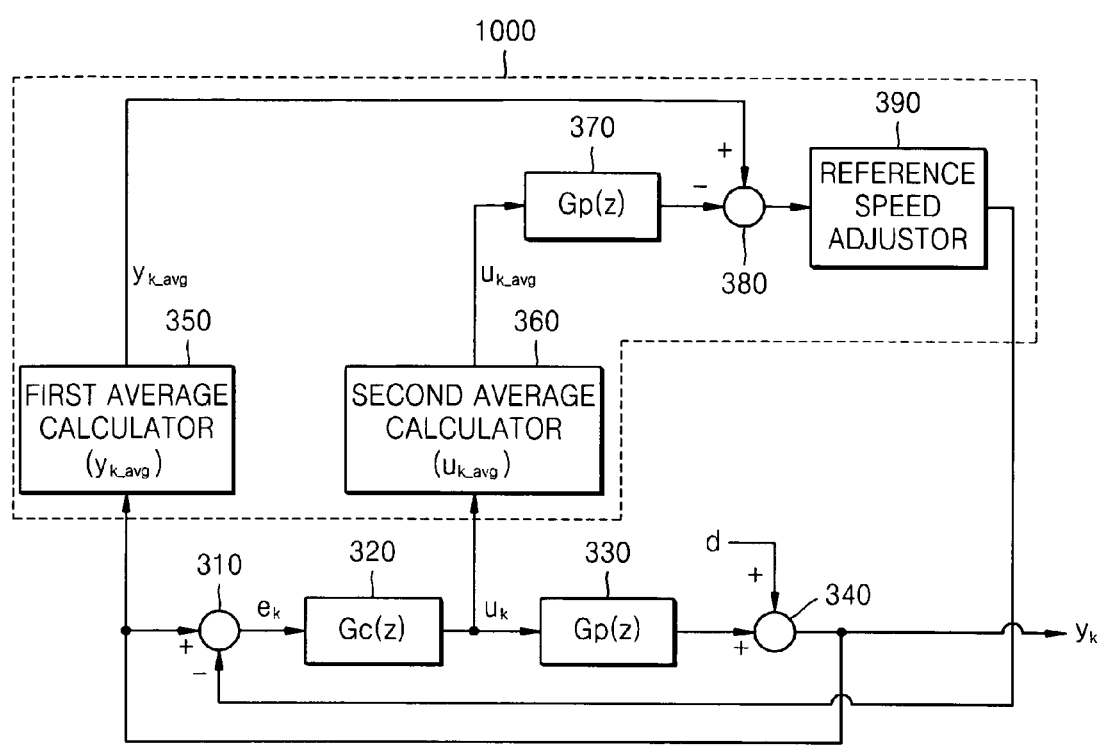
FIG. 3 is a block diagram of an apparatus for compensating repeated false speed errors in a DC motor according to an embodiment of the present invention.

FIG. 3 is a block diagram of an exemplary circuit implementing a method adapted to compensate for recurring false speed errors. Any or all of the various components described in relation to this exemplary circuit may be implemented in software (e.g., executable code segments) running on a competent controller. In one aspect, the control method may make good use of a learning control algorithm. Such a learning control algorithm may be implemented, for example, within motor control circuit 74 shown in FIG. 2.

Referring to FIG. 3, the illustrated circuit for compensating recurring false speed errors according to an embodiment of the invention includes subtractors 310 and 380, a speed controller 320, implementing a first transfer function Gc(z), a spindle motor driving system 330, implementing a second transfer function Gp(z), an adder 340, a first average calculator 350, a second average calculator 360, a plant modeling tool 370, implementing the second transfer function Gp(z), and a reference speed adjustor 390.

In the above configuration, a block, including collectively first average calculator 350, second average calculator 360, plant modeling tool 370, subtractor 380, and reference speed adjustor 390, is referred to as a learning control unit 1000.

Adder 340 receive a disturbance control signal "d" indicative of a disturbance experienced by the spindle motor. Plant modeling tool 370 and spindle motor driving system 330 are units adapted to implement a (second) transfer function consistent with plant model, (e.g., a function based on theoretical performance assumptions related to an ideal spindle motor). Plant modeling tool 370, thus, models an ideal spindle motor driving system regardless of any mechanical tolerance apparent in the spindle motor.

Speed controller 320 may be variously implemented using, for example, a proportional and integral (PI) controller.

Figure 5:
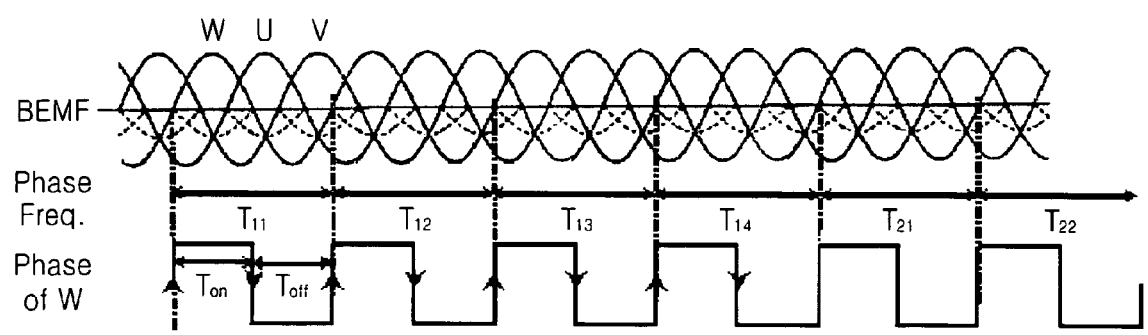
FIG. 5 is a waveform diagram illustrating processes of phase signals using back electromotive force of a spindle motor.

FIG. 5 illustrates the back electromotive force (BEMF) generated in the driving circuit of spindle motor driving system 330 when driving the spindle motor. A corresponding phase signal is also shown. The phase signal may be generated in relation to one phase of the motor. The frequency of the phase signal is proportional to the number of poles of the permanent magnet in the motor and the rotational speed of the motor. Therefore, the feedback sampling frequency can be increased to the number of maximum poles of the permanent magnet. That is, if the number of poles of the permanent magnet in the motor is eight, four positive edges and four negative edges are generated, and thus, eight phase changes are generated. Therefore, the motor can be controlled eight times corresponding to the number of phase changes.

However, the magnetized poles are typically not regularly spaced due to the mechanical tolerance of the permanent magnet in the motor. Thus, if the sampling frequency is increased, a false speed error may be generated. That is, the driving speed may be determined to be slower or faster than the reference speed due to the false speed error even when the motor drives at the constant speed, and thus, attempts to drive the motor at a constant speed are interfered with by the false speed errors.

In addition, if the speed of the motor is controlled once per rotation of the disk, the rotational speed of the disk is largely changed due to the low sampling frequency, and thus precise controlling operations cannot be performed.

Accordingly, embodiments of the invention provide a method of controlling the rotational speed of the disk twice or more per rotation of the disk by improving the sampling frequency, and eliminating recurring false speed errors due to the mechanical tolerance of the motor using the learning control algorithm.

In one specific embodiment of the invention, as an example, the control system controls the rotational speed of the disk four times (4×) per rotation of the disk. That is, referring to FIG. 5, controlling sections T11~T14 correspond to one rotation of the disk, and a speed error is detected during each section T11, T12, T13, or T14 so the speed can be controlled four times per rotation of the disk.

If the motor is driven without adopting a control method compensating for the mechanical tolerance, the points in time allocated to controlling sections T11, T12, T13, . . . of FIG. 5 are different from each other due to the mechanical tolerance of the permanent magnet in the motor—even if the disk is rotated at a constant speed. In addition, the duration of "Ton" and "Toff" are different from each other. When the duration of the controlling sections are different regardless of the constant rotation speed, false speed errors are generated, and the motor may suffer from corresponding fine oscillations.

In an embodiment of the present invention, the false speed error generated due to the mechanical tolerance of the motor is reduced using a control method that takes advantage of a learning control algorithm.

At an initial stage of driving the spindle motor, the reference speed adjustor 390 will generate an initial reference speed signal.

As the spindle motor continues to rotate, the spindle motor driving system 330 detects the actual speed (yk) of the spindle motor in each of the controlling sections, and then, applies (through adder 340) the detected speed (yk) to subtractor 310 and first average calculator 350. For example, the speed (yk) of the spindle motor in the section T11 of the phase signal can be measured by counting the number of internal clock cycles generated during the controlling section T11.

Subtractor 310 outputs a speed error (ek) by subtracting the actual speed (yk) of the spindle motor detected during the controlling section from the reference speed signal provided by reference speed adjustor 390.

Then, speed controller 320, assumed to be implemented as PI controller in the illustrated example, generates a control input signal (uk) using equation 1.

$$u_k = K_F \cdot \epsilon_k + K_1 \cdot \Sigma \epsilon_k + K_{FF} \quad (1)$$

Here, KP denotes a proportional gain constant, K1 denotes an integral gain constant, and KFF denotes a defined feedforward constant.

The control input signal (uk) for each controlling section generated by speed controller 320 is applied to spindle motor driving system 330 and second average calculator 360, respectively.

Spindle motor driving system 330 generates a driving voltage corresponding to the control input signal (uk) to be applied to the spindle motor, measures the actual rotational speed of the spindle motor during the next controlling section, and feeds back this measurement to subtractor 310 and first average calculator 350.

As the control method continues forward during operation of the spindle motor, each of the controlling sections is based on the reference speed as initially set, but the learning control unit 1000 detects any false speed errors and compensates for such errors using the following method.

First average calculator 350 calculates an average value of the measured speed (yk) in each controlling section, in which a false speed error is generated, as follows.

In a case where one rotation of the spindle motor includes four controlling sections, controlling sections T11, T12, T13, T14 are generated as the spindle motor rotates once, controlling sections T21, T22, T23, T24 are again generated as the spindle motor rotates again, and so on, until controlling sections TN1, TN2, TN3, TN4 are generated when the spindle motor has rotated N times.

The sections T11, T21, T31, . . . , TN1 are the sections generating phase signals in response to the same magnetic pole of the spindle motor. The sections T12, T22, T32, . . . , TN2, T13, T23, T33, . . . , TN3, and T14, T24, T34, . . . , TN4 are the sections generating respective phase signals corresponding to respective magnetic poles.

If a mechanical tolerance is apparent in the spindle motor, false speed errors are recurring generated in respective sets of controlling sections (T11, T21, T31, . . . , TN1), (T12, T22, T32, . . . , TN2), (T13, T23, T33, . . . , TN3), and (T14, T24, T34, . . . , TN4).

Accordingly, first average calculator 350 calculates an average value (yk_avg) for the actual speed (yk) of the spindle motor measured in each of these four controlling section sets.

Next, second average calculator 360 calculates an average value (uk_avg) of the control input signals (uk) for each set of the controlling sections, in which the false speed errors are generated.

In addition, plant modeling tool 370 calculates an estimated speed for the spindle motor with respect to the averages value (uk_avg) of the control input signals (uk) in each set of the controlling sections, in which the false speed errors are repeatedly generated, using a plant model that is designed to have the same properties as that of spindle motor driving system 330.

Next, subtractor 380 subtracts the estimated speed of the spindle motor in each controlling section calculated by plant modeling tool 370 from the average value (yk_avg) of the speed (yk) of the spindle motor in each controlling section (that is, in each set of four controlling sections) calculated by first average calculator 350.

Accordingly, subtractor 380 calculates the false speed error of each controlling section that is repeatedly generated by the mechanical tolerance of the spindle motor.

Then, reference speed adjustor 390 changes the reference speed of each controlling section to decrease the false speed error calculated by subtractor 380. For example, reference speed adjustor 390 may adjust the reference speed in each controlling section using a look-up table, in which corrected reference speed information with respect to the false speed error of each controlling section is defined. When the look-up table is set, the reference speed of each controlling section is determined by adding the false speed error input from subtractor 380 to the initial reference speed.

The reference speed adjusted according to the controlling section in the reference speed adjustor 390 is applied to subtractor 310 to control the spindle motor. Accordingly, even when a mechanical tolerance is apparent in the spindle motor, the reference speed may be adjusted by individual controlling section unit to prevent false speed errors from being generated.

For example, the value of N that determines the length of a learning controlling algorithm may be set 100 or any other reasonable sample size. In this case, the learning algorithm for detection of a false speed error is executed during the first 100 rotations of spindle motor 100. Then, the reference speed for each controlling section is adjusted.

Figure 4:
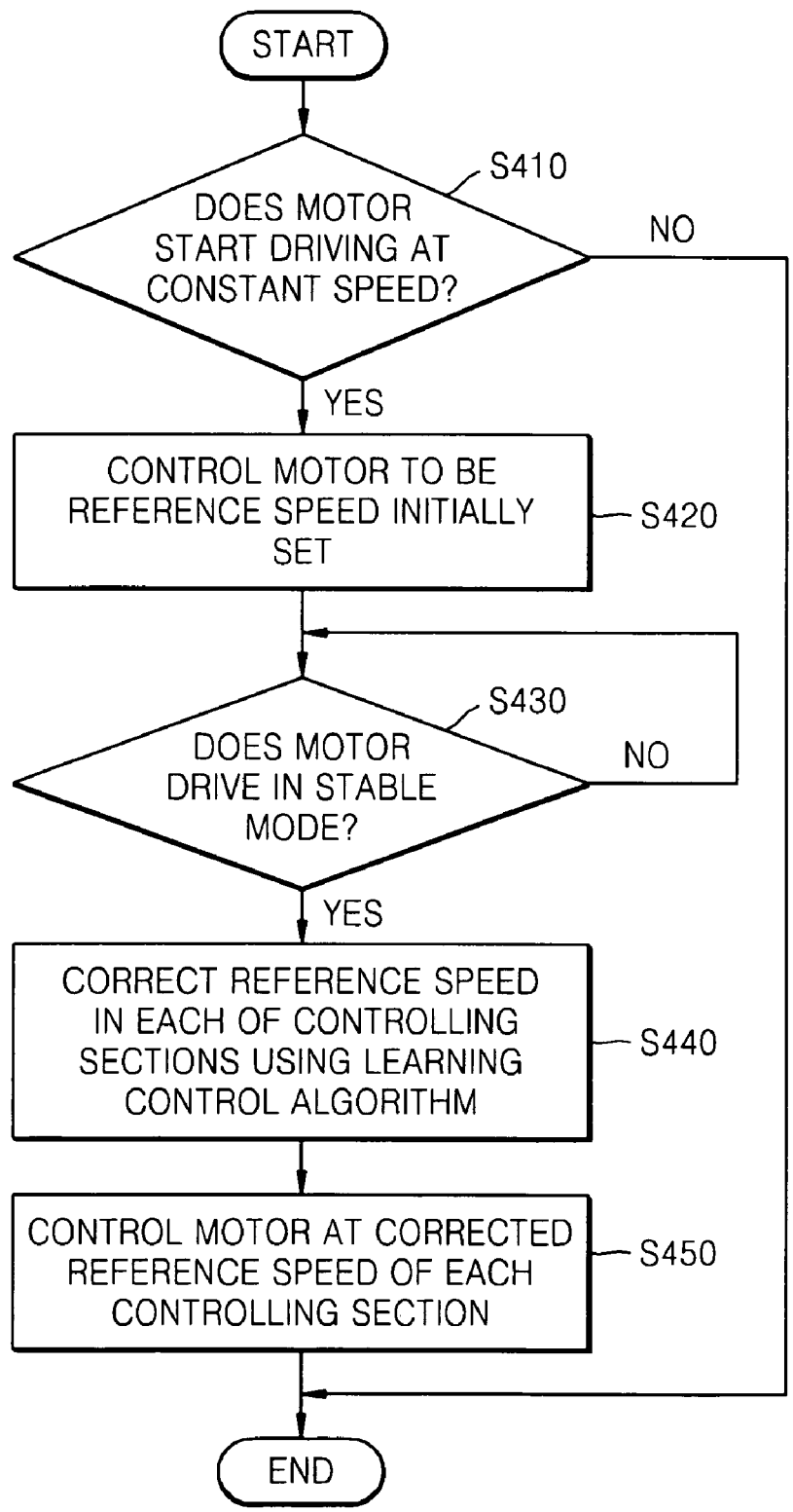
FIG. 4 is a flow chart illustrating a method of compensating the repeated false speed errors in a DC motor according to an embodiment of the present invention.

FIG. 4 is a flow chart illustrating an exemplary method for compensating for recurring false speed errors in the DC motor according to an embodiment of the present invention.

A motor control circuit 74 of the HDD determines whether the spindle motor has begun to rotate at a constant speed (S410). In the HDD, the spindle motor starts running at the constant speed in a case where the electric power is supplied to initiate operation of the HDD or where the HDD transitions from a sleep mode to an operational mode. Therefore, the on-start of spindle motor driving may be determined in relation to either of these, or similar, events.

Once the spindle motor running at a constant speed has been determined, the motor control method is executed in relation to a reference speed as initially set (S420). In this case, respective reference speeds for the controlling sections will typically be equal under assumptions associated with operation of an ideal motor.

After that, a determination is made as to whether control of the spindle motor has resulted in stable operation (S430). Stable mode operation may be determined by reference to speed error (ek) in relation to a predetermined threshold value over a defined period of time. Otherwise, stable mode operation may be determined by determining whether a threshold time, during which the spindle motor can be transferred to the stable mode after starting driving, has elapsed.

Once it is determined that the spindle motor is in stable mode operation, the control method corrects the reference speed for each controlling section unit using, for example, a learning control algorithm (S440).

In one exemplary learning control algorithm, an average motor speed value during each controlling section in which a false speed error occurs is calculated. Next, an average value for the control input signals driving the spindle motor in each controlling section in which the false speed error occurs is calculated. In addition, the motor speed is estimated according to the average value of the control input signals using the plant modeling tool.

Then, a false error for each controlling section, which is obtained by subtracting the speed of the spindle motor, as estimated by the plant modeling tool, from the average value of the actual motor speed is generated.

The reference speed for each controlling section is corrected so as to decrease the false speed error of each controlling section generated in the above method.

The spindle motor is controlled by adopting the reference speed of each controlling section, which is corrected by the learning control algorithm (S450).

The false speed errors that recur due to a mechanical tolerance apparent in the spindle motor may be compensated for using the above learning control algorithm.

Elimination of recurring disturbances generated as a result of the mechanical tolerance of the spindle motor using the learning control algorithm according to an embodiment of the invention may be calculated as follows.

Input/output of the disturbance in FIG. 3 can be represented by equation 2.

$$y_k(z) = \frac{1}{1 - G_P(z)G_C(z)}(rpj(z) + nrj(z)) \quad (2)$$

Here, $rpj(z)$ denotes recurring disturbances, and $nrj(z)$ denotes non-recurring disturbances.

The mechanical tolerance that is an object to be learned is applied to the system as the recurring disturbance, and the recurring disturbance generated due to the mechanical tolerance can be represented by equation 3.

$$rpj(z) = (1 - G_P(z) \cdot G_C(z)) \cdot y_{k\_AVG}(z) \quad (3)$$
$$= y_{k\_AVG}(z) - G_P(z) \cdot G_C(z) \cdot y_{k\_AVG}(z)$$
$$= y_{k\_AVG}(z) - G_P(z) \cdot u_{k\_AVG}(z)$$

As described above, reference speed adjustor 390 of learning control unit 1000 adds rjc(i) to compensate for the recurring false speed error (e.g., jitter) during each controlling section to the initial reference speed (v_ref. Here, reference speed adjustor 390 determines the value of rjc(i) to be equal to the value of rpj(i).

Accordingly, reference speed adjustor 390 adjusts the reference speed of each controlling section to be (v_ref+rjc(i)) after executing the learning control algorithm.

In addition, the speed error ek(I+1) after executing the learning control algorithm can be represented by equation 4.

$$e_k(i+1) = y_k(i) - (\text{v\_ref} + rjc(i)) \quad (4)$$
$$= u_k(i) \cdot G_P + rpj(i) + nrj(i) - \text{v\_ref} - rjc(i)$$
$$= u_k(i) \cdot G_P - \text{v\_ref} + nrj(i)$$

According to Equation 4, the recurring disturbances may be fully compensated by the learning control algorithm, leaving only the non-recurring disturbances to affect the system. Since the recurring disturbances have been eliminated, the false speed errors generated due to the recurring disturbances are also essentially eliminated.

In an embodiment of the invention, the learning control algorithm is continuously executed after initial stage motor operations in order to control the reference speed in each controlling section. However, the learning control algorithm might be performed on only a periodic basis during operation of the motor.

According to the present invention, the false speed errors that recur due to the presence of a mechanical tolerance in the spindle motor can be compensated using the learning control algorithm. Thus, the overall effect of the mechanical tolerance on performance of the spindle motor can be minimized while increasing the sampling frequency, and the controlling of the spindle motor is improved.

Embodiments of the invention may be implemented as a control method, a related apparatus, or system. Embodiments of the invention maybe implemented, wholly or in part, by executable code segments. Such code segments can be stored in a processor readable medium, or can be transmitted by computer data signals combined with carrier wave in a transmission medium or a network. The processor readable medium can be any medium that can store or transmit information, for example, an electronic circuit, a semiconductor memory device, a read only memory (ROM), a flash memory, an erasable ROM (EROM), a floppy disk, an optical disk, a hard disk, an optical fiber medium, and a radio frequency (RF) network. The computer data signal can be any signal that can be transmitted on the transmission medium such as an electronic network channel, an optical fiber, air, an electronic field, or an RF network.

While the present invention has been particularly shown and described with reference to exemplary embodiments thereof, it will be understood by those of ordinary skill in the art that various changes in form and details may be made therein without departing from the scope of the invention as defined by the following claims.

What is claimed is:

1. A motor control apparatus compensating recurring false speed errors in a direct current (DC) motor, comprising:
 a learning control unit configured to calculate an average value for an actual measured motor speed in each of a plurality of controlling sections associated with a single rotation of the motor, calculate an average value of control input signals driving the motor in each of the controlling sections, calculate an estimated motor speed in each of the controlling sections according to the average value of the control input signals, and generate a reference speed in each of the controlling sections by subtracting the estimated motor speed in each of the controlling sections from the average value of the actual measured motor speed; and a motor control unit adapted to control the rotational speed of the motor in relation to a speed error defined by a difference between the reference speed for each controlling section and an actual measured speed of the motor for each controlling section.

2. The apparatus of claim 1, wherein the learning control unit comprises; a plant modeling tool configured to generate the reference speed in each of the controlling sections.

3. The apparatus of claim 2, wherein the actual measured speed of the motor is calculated using a phase signal generated in relation to a back electromotive force of the motor.

4. The apparatus of claim 2, wherein the learning control unit further comprises:

a first average calculator configured to calculate the average value of the actual measured motor speed in each of the controlling section in which a recurring false speed error is generated in relation to an initial reference speed;

a second average calculator configured to calculate the average value of control input signals driving the motor in each of the controlling sections in which a recurring false speed error is generated in relation to the initial reference speed;

wherein the plant modeling tool is further configured to calculate the estimated motor speed in each of the controlling section according to the average value of the control input signals;

a subtractor configured to calculate the false speed error in each controlling section by subtracting the estimated motor speed in each of the controlling sections from the average value of the actual measured motor speed; and a reference speed adjustor configured to adjust the reference speed in each of the controlling sections to decrease the false speed error.

5. The apparatus of claim 4, wherein the plurality of controlling sections is N, N being an integer greater than 1, and the number of controlling sections having a recurring false speed error is N.

6. The apparatus of claim 4, wherein the reference speed adjustor is further configured to adjust the reference speed of each controlling section using a look-up table in which corrected reference speed information corresponding to false speed errors in each of the controlling sections is defined.

7. The apparatus of claim 6, wherein the motor includes a brushless DC motor.

8. A method controlling operation of a direct current (DC) motor, the motor having a mechanical tolerance generating recurring false speed errors, the method comprising:

determining operation of the motor at a constant speed;

controlling the speed of the motor in accordance with an initial reference speed;

calculating an average value for an actual measured motor speed in each of a plurality of controlling sections associated with a single rotation of the motor;

calculating an average value of control input signals driving the motor in each of the controlling sections;

calculating an estimated motor speed in each of the controlling sections according to the average value of the control input signals;

generating a reference speed in each of the controlling sections by subtracting the estimated motor speed in each of the controlling sections from the average value of the actual measured motor speed; and changing the reference speed from the initial reference speed for each controlling section to decrease the corresponding false speed error of each controlling section.

9. The method of claim 8, wherein calculating the estimated motor speed in each of the controlling sections according to the average value of the control input signals comprises estimating the motor speed in relation to the average value of the control input signals using a plant modeling tool.

10. The method of claim 9, wherein the plurality of controlling sections is N, N being an integer greater than 1, and the number of controlling sections having a recurring false speed error is N.

11. The method of claim 8, wherein the changing of the reference speed from the initial speed for each of the controlling sections comprises using a look-up table in which corrected reference speed information corresponding to false speed errors is defined.

* * * * *